United States Patent [19]

Dougherty et al.

[11] 3,866,187

[45] Feb. 11, 1975

[54] METHOD OF RECORDING AND REPRODUCING INFORMATION IN FERROELASTIC METALS

[75] Inventors: Joseph Patrick Dougherty, Ossining; Andrew Lawrence Dalisa, Yorktown Heights; Robert John Seymour, Ossining, all of N.Y.

[73] Assignee: North American Philips Corporation, Briarcliff Manor, N.Y.

[22] Filed: July 2, 1973

[21] Appl. No.: 375,785

[52] U.S. Cl. .................... 340/173 R, 340/173 TP, 340/173 MS, 346/1

[51] Int. Cl. .............................................. G11c 13/00

[58] Field of Search ... 340/173 R, 173 TP, 173 MS; 346/1, 139

[56] References Cited

UNITED STATES PATENTS

| | | | |
|---|---|---|---|
| 1,891,780 | 12/1928 | Rutherford | 340/173 TP |
| 2,985,866 | 5/1961 | Norton | 340/173 TP |
| 3,040,124 | 6/1962 | Camras | 340/173 TP |
| 3,406,405 | 10/1968 | Somers | 340/173 TP |
| 3,787,873 | 1/1974 | Sato | 340/173 TP |

*Primary Examiner*—Terrell W. Fears
*Attorney, Agent, or Firm*—Frank R. Trifari; Carl P. Steinhauser

[57] ABSTRACT

Information is stored in a thin film of a ferroelastic metal by initially deforming the metal film to a state of stable remanent strain, e.g., by an air jet, stylus, or electrostatic repulsion, or attraction and thereafter locally heating the metal film above its ferroelastic transition temperature to remove the remanent strain therein and restore those portions of the film to their prestrained condition. Thus, information can be stored on the metal film (in a pattern of deformed and undeformed regions) by using the local heating means responsive to a source of information. The information can be subsequently readout by optically, or electrically interrogating the metal film. This technique provides a method for achieving a high density information storage system with read-write-erase capability.

10 Claims, No Drawings

METHOD OF RECORDING AND REPRODUCING INFORMATION IN FERROELASTIC METALS

This invention relates to a method of information storage and retrieval in ferroelastic metals.

A ferroelastic material is one that exhibits:

1. a stable remanent strain in the ferroelastic state with respect to the paraelastic state above the ferroelastic Curie temperature;
2. a paraelastic state where there is no stable remanent strain;
3. a ferroelastic Curie temperature at which a reversible thermoelastic (low temperature hysteresis) martensitic (diffusionless) transition occurs; and
4. a hysteresis in its stress-strain characteristics, and an anomaly in one of the elastic constants at the Curie temperature;

Certain alloys undergoing martensitic phase transitions, but whose ferroelastic character has not yet been ascertained, have been shown to have useful shape memory properties.

For example, in U.S. Pat. No. 3,652,967 a nickel-titanium wire is prestressed and heated to return it to its unstressed state. After several cycles such a wire can be used in control and work performing devices.

U.S. Pat. No. 3,558,369 describes metal alloys of the formula Ti $Ni_x$ Co1-x and Ti $Co_x$ Fe1-x wherein $x$ is a number from 0 to 1 which are prestressed and heated to cause them to revert back to their original state. Such alloys are stated to be useful in control devices.

U.S. Pat. No. 3,450,372 describes a foldable antenna for a spacecraft vehicle which is unfolded by heat radiation. Such antennas are made of a nickel-titanium alloy which reverts back to its original state upon heating.

We have conceived of a technique for recording, reading and erasing information in small areas ($10^{-4}$ to $10^{-}$cm 2) using materials which exhibit a reversible elastic transition. The ferroelastic metals previously described are one example of such a material.

In accordance with the invention, a thin film of such a material which may be prepared by conventional rolling, sputtering or other established metallurgical processes, e.g., a metal disc elongated strip which undergoes a ferroelastic transition, is intially prestrained in the ferroelastic phase to produce a remanent strain. For example, the metal alloy may be prestrained by air jets, a stylus, or an electrostatic force of repulsion or attraction.

Once the metal film is prestrained, information is recorded on the metal alloy by locally heating discrete portions above the ferroelastic Curie temperature, i.e., the metal alloy at those portions is relaxed so that it is free of remanent strain, a necessary condition in the paraelastic phase. Upon cooling from the paraelastic to the ferroelastic phase the material will twin and the macroscopic strain previously introduced will be relieved. This heating and cooling cycle may be most easily accomplished by a focussed laser beam controlled by an information signal which is to be recorded. Upon completion of the recording of the information signal, the information is stored as a surface relief pattern in the metal alloy.

In order to reproduce the information stored in the metal alloy it must be "read-out" and this is most easily accomplished by using a low-power laser to scan the metal film, and detecting the modulated reflected beam which contains the information.

Modes of parallel storage are also possible, for example, by uniformly deforming a large area with a grating structure and then allowing a diffraction pattern to locally relax regions within the deformed area as previously described. This local area would constitute a carrier frequency hologram. Alternatively a standard hologram may be recorded by uniformly deforming a local area and allowing a holographic pattern to relax the illuminated (heated) regions in the manner previously described.

In order to erase previously recorded information, the locally relaxed areas are re-deformed as previously described so that the material is again available for recording new information.

The recorded information on a material may also be read-out electrically. The deformed and undeformed region can be sensed through a change in capacitive coupling. This may be achieved by having the material applied over an electrically responsive substrate, e.g., a MOS array; or a capacitance sensitive detector head can be scanned over the surface of the material.

The particular material that can be used is a matter of choice provided that it is known to exhibit a reversible elastic transition. Several such materials are known as described in the aforesaid references. In addition, a number of such material alloys are described in Journal of Applied Physics, Vol. 26, No. 4, 1955, page 473. In particular one possible ferroelastic alloy system is described in the Journal of the Physical Society of Japan, Vol. 35, No. 5, November 1972, page 1350–1360 which is a gold-copper-zinc alloy, $Au_x Cu_{y-x} Zn_{1-y}$, $0.15 < x < 0.35$ and $0.40 < y < 0.60$. Thus, a film of this material obtained by rolling and having a thickness of about 1 mil was exposed to a laser modulated with a video signal which was recorded in the film as a surface relief pattern.

What we claim is:

1. A method of recording, retrieving and erasing information comprising the steps of prestressing a ferroelastic metal having a reversible elastic transition above a given temperature to deform the surface thereof, locally heating portions of said metal above its transition temperature to relieve strain in said portions in response to an information signal and to store the information as surface relief pattern in the metal, and thereafter scanning said surface to detect variations in surface relief therein.

2. A method of recording information as claimed in claim 1 in which the metal is locally heated by a laser.

3. A method of recording information as claimed in claim 2 in which a local area is heated by a laser produced holographic pattern to locally relax regions within the deformed area.

4. A method of recording, retrieving and erasing information as claimed in claim 1 in which said metal is applied over an electrically responsive substrate and deformed and undeformed states are sensed by a change in an electrical condition.

5. A method of retrieving information as claimed in claim 4 in which said electrical condition which is sensed is a change in capacitive coupling.

6. A method of recording, retrieving and erasing information as claimed in claim 5 in which the electrically responsive substrate is an MOS-array.

7. A method of recording and erasing information as claimed in claim 1 in which the metal is deformed by an air jet.

8. A method of recording and erasing information as claimed in claim 1 in which the metal is deformed by a stylus.

9. A method of recording and erasing information as claimed in claim 1 in which the metal is deformed by electrostatic repulsion or attraction.

10. A method of recording retrieving and erasing information as claimed in claim 1 in which the metal is a thin film of a gold-copper alloy, $Au_x Cu_{y-x} Zn_{(1-y)}$, $0.15 < x < 0.35$ and $0.40 < y < 0.60$.

* * * * *